(12) United States Patent
Nakata

(10) Patent No.: US 6,764,208 B2
(45) Date of Patent: Jul. 20, 2004

(54) LAMP DEVICE FOR VEHICLE

(75) Inventor: Yutaka Nakata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 9 days.

(21) Appl. No.: 10/051,293

(22) Filed: Jan. 22, 2002

(65) Prior Publication Data

US 2002/0136022 A1 Sep. 26, 2002

(30) Foreign Application Priority Data

Jan. 22, 2001 (JP) .......................................... 2001-013893

(51) Int. Cl.[7] ................................................ B60Q 1/00
(52) U.S. Cl. ...................... 362/507; 362/516; 362/328
(58) Field of Search ................................. 362/507, 516, 362/520, 310, 343, 308, 328

(56) References Cited

U.S. PATENT DOCUMENTS

| 4,680,977 A | * | 7/1987 | Conero et al. ............ 73/861.41 |
| 5,204,820 A |   | 4/1993 | Strobel et al. |
| 6,123,440 A | * | 9/2000 | Albou ......................... 362/516 |
| 6,527,425 B1 | * | 3/2003 | Nakata ........................ 362/516 |

FOREIGN PATENT DOCUMENTS

| JP | 2001-35215   | 2/2001 |
| JP | 2001-35215 A | 9/2001 |

OTHER PUBLICATIONS

Rogers et al., "Mathematical Elements for Computer Graphics," Second Edition, McGraw–Hill, 1990; pp. 445–446.

* cited by examiner

Primary Examiner—Alan Cariaso
Assistant Examiner—Mark Tsidulko
(74) Attorney, Agent, or Firm—Foley & Lardner LLP

(57) ABSTRACT

A shape of a vertical cross section and a shape of a horizontal cross section in a lens are formed in a convex shape. Accordingly, even when a prism is not formed, alight transmitting through the lens is largely refracted and an interior section is hard to be visible. As a result, it is not necessary to finish a surface of a reflection surface of a reflector so as to have an optical performance equal to or more than an optical performance required for reflection with taking an appearance into consideration, and a working operation can be easily executed in comparison with the conventional one.

9 Claims, 10 Drawing Sheets

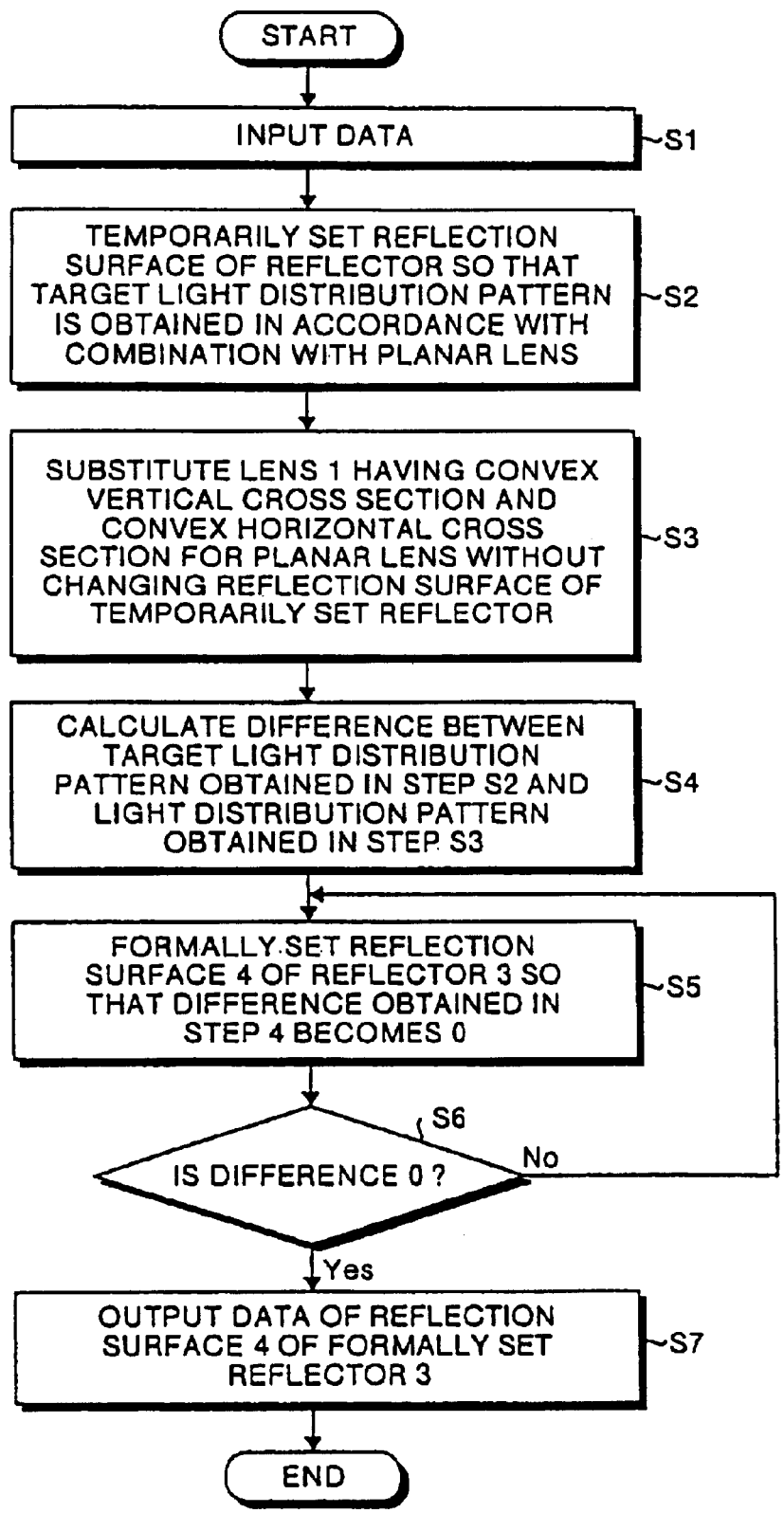

FIG.7A
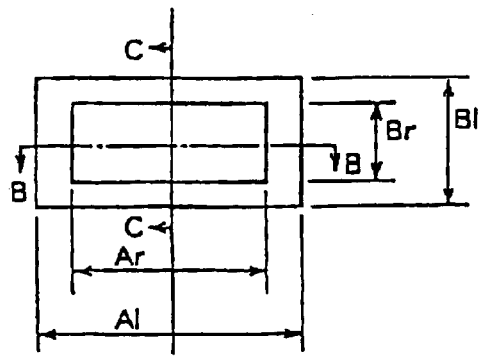
FIG.7D
FIG.7C
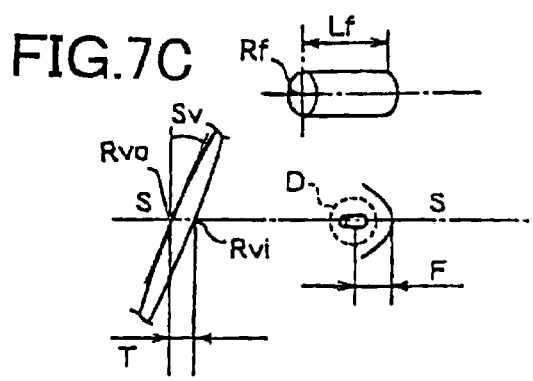
FIG.7B
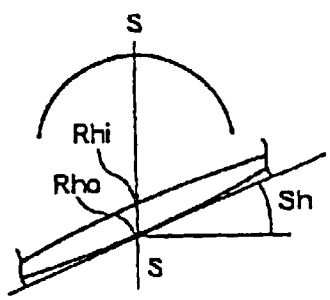
FIG.8A
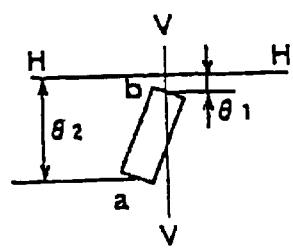
FIG.8B
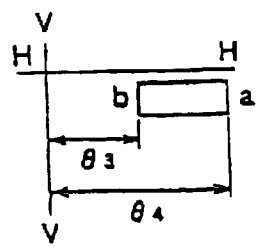

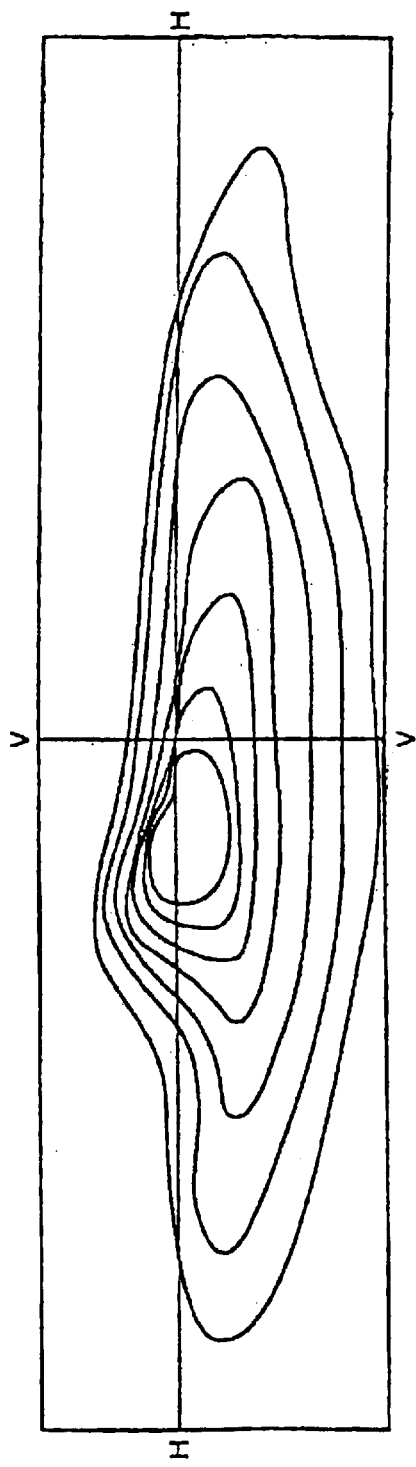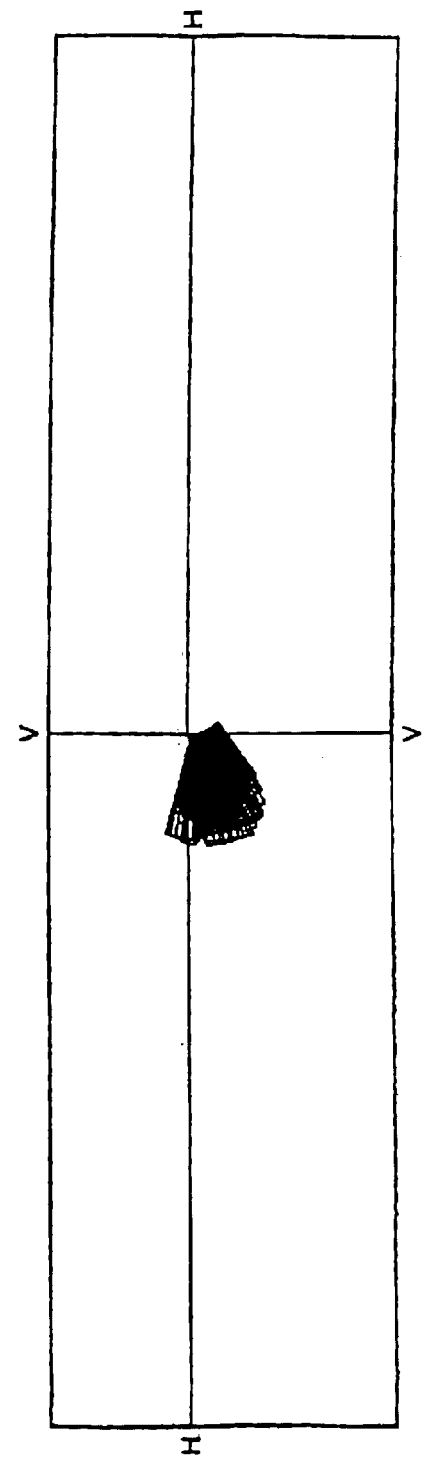

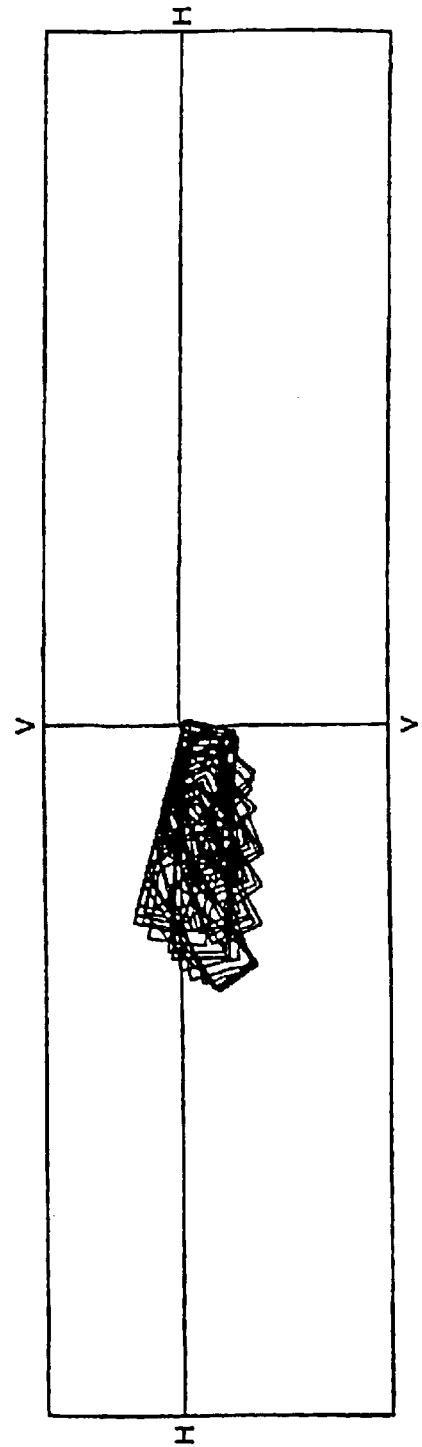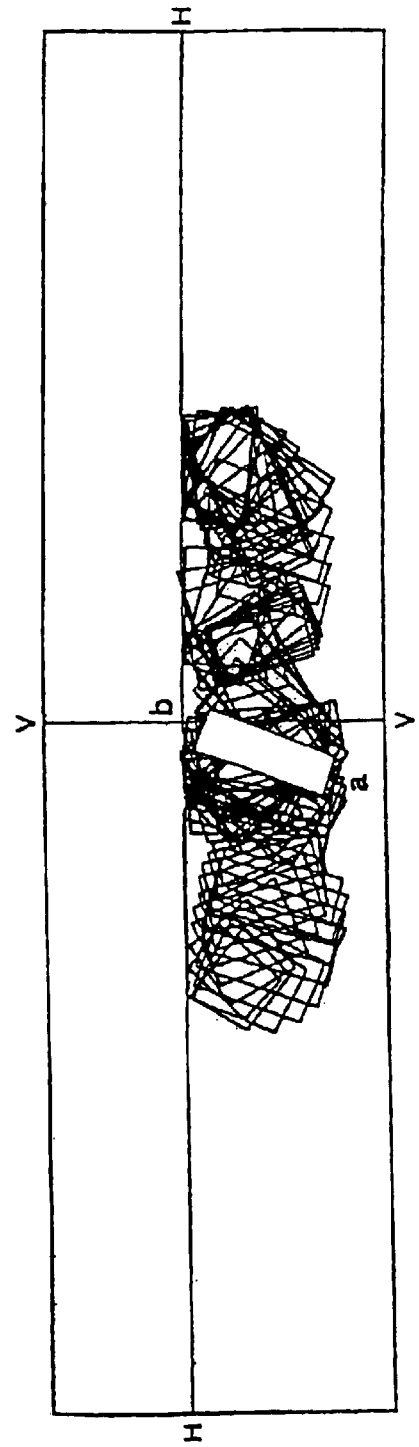

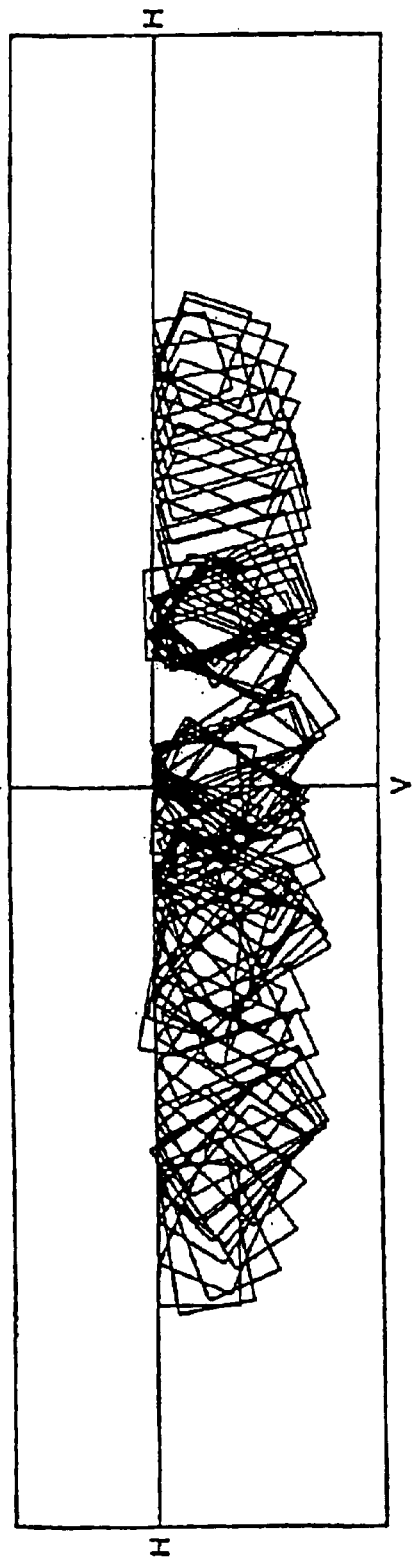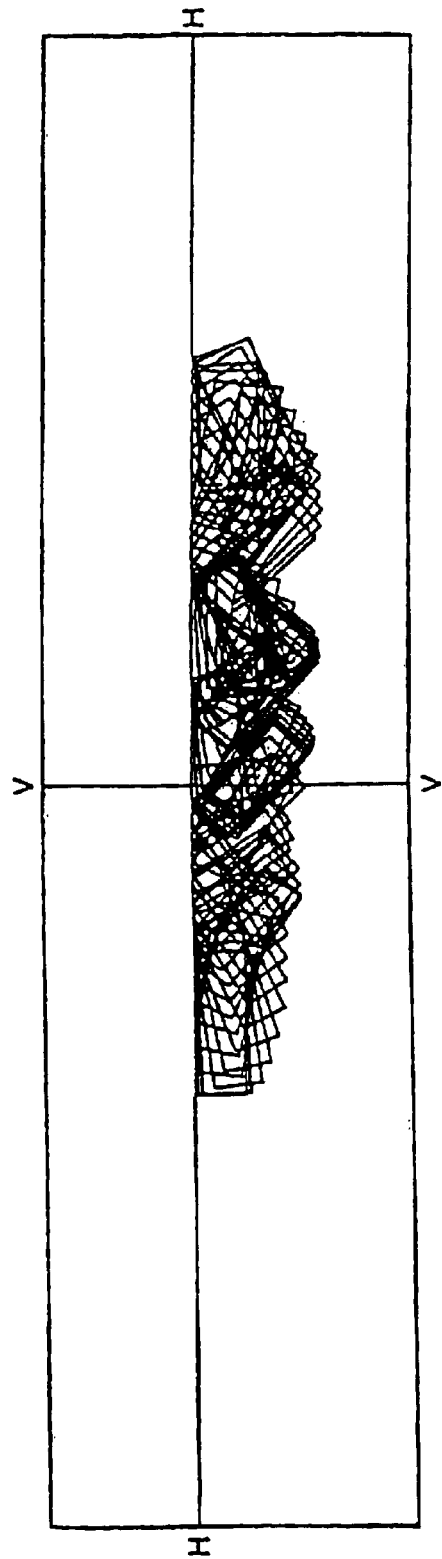

US 6,764,208 B2

LAMP DEVICE FOR VEHICLE

FIELD OF THE INVENTION

The present invention relates to a lamp device for a vehicle, for example, a head lamp for a motor vehicle, a fog lamp for a motor vehicle or the like which lights a forward section of the motor vehicle. In particular, the invention relates to a lamp device for a vehicle in which a light distributing function is mainly given to a reflector side.

BACKGROUND OF THE INVENTION

In a recent lamp device for a vehicle, a reflection surface of a reflector is formed in a free curves surface and a light distributing function is given to a side of the reflector. Further, in the recent lamp device for the vehicle, a so-called plain lens is used as a lens thereof and a function of an outer cover is given to a side of the lens. The plain lens corresponds to a lens in which a prism for light distribution is not formed and the light transmits as it is without being refracted. That is, the plain lens is constituted by a light transmitting member formed in a plate (a flat plate, a curved plate) shape such as a simple plate glass or the like.

However, in the conventional lamp device for the vehicle, the reflection surface of the internal reflector is clearly visible through the plain lens from an external section. Accordingly, it is necessary that the conventional lamp device for the vehicle is finished so as to have at least an optical performance required for reflection on a surface of the reflection surface of the reflector, and this working operation is troublesome.

Accordingly, the inventors of this invention have invented a lamp device for a vehicle in which an interior section is made hard to be visible in comparison with the plain lens (Japanese Patent Application No. 11-209331 (Japanese Patent Application Laid-Open No. 2001-35215).

SUMMARY OF THE INVENTION

It is an object of this invention to provide a lamp device for a vehicle in which a surface finishing process of a reflection surface in a reflector can be easily executed than the conventional one by making an interior section hard to be viewed in comparison with a plain lens.

In order to achieve the object, according to one aspect of the present invention, there is provided the lamp device for a vehicle wherein, a shape of a vertical cross section and a shape of a horizontal cross section in a lens are convex shapes.

As a result, in accordance with the invention, since the shape of the vertical cross section and the shape of the horizontal cross section in the lens have the convex shape, a light transmitting through the lens is largely reflected without a prism being formed, whereby the interior section becomes hard to be viewed. Accordingly, in accordance with the invention, it is not necessary to finish the surface of the reflection surface of the reflector so as to have an optical performance equal to or more than an optical performance required for reflection with taking an appearance into consideration, and the working operation can be easily executed in comparison with the conventional structure.

Other objects and features of this invention will become understood from the following description with reference to the accompanying drawings.

BRIEF DESCRIPTION OF THE DRAWINGS

FIG. 6 is a flowchart showing a method of manufacturing the reflection surface;

FIG. 7A is a front elevational view for explanation showing a data input to an optical simulation;

FIG. 7B is a cross sectional view along a line B—B in FIG. 7A;

FIG. 7C is a cross sectional view along a line C—C in FIG. 7A;

FIG. 7D is an enlarged view of a section D in FIG. 7C;

FIG. 8A is a explanatory view which shows a representative light distribution pattern given by a pin point $P_1$ in FIG. 5 projected on a screen;

FIG. 8B is an explanatory view which shows a representative light distribution pattern given by a pin point $P_2$ in FIG. 5 projected on the screen;

FIG. 9 is an equiluminous curve showing a target distribution pattern of a low beam given by the head lamp for the motor vehicle in accordance with the first embodiment;

FIG. 10 is an explanatory view of a light distribution pattern briefly showing a light distribution pattern obtained by a lens shown in FIGS. 1 to 4 and a first reflection surface block 21 from the left of the reflection surface 4 shown in FIG. 5, which is obtained in accordance with a simulation of a computer;

FIG. 11 is an explanatory view of a light distribution pattern briefly showing a light distribution pattern obtained by the lens 1 shown in FIGS. 1 to 4 and a second reflection surface block 22 from the left of the reflection surface 4 shown in FIG. 5, which is obtained in accordance with the simulation of the computer;

FIG. 12 is an explanatory view of a light distribution pattern briefly showing a light distribution pattern obtained by the lens 1 shown in FIGS. 1 to 4 and a third reflection surface block 23 from the left of the reflection surface 4 shown in FIG. 5, which is obtained in accordance with the simulation of the computer;

FIG. 13 is an explanatory view of a light distribution pattern briefly showing a light distribution pattern obtained by the lens 1 shown in FIGS. 1 to 4 and a fourth reflection surface block 24 from the left of the reflection surface 4 shown in FIG. 5, which is obtained in accordance with the simulation of the computer;

FIG. 14 is an explanatory view of a light distribution pattern briefly showing a light distribution pattern obtained by the lens 1 shown in FIGS. 1 to 4 and a fifth reflection surface block 25 from the left of the reflection surface 4 shown in FIG. 5, which is obtained in accordance with the simulation of the computer;

DETAILED DESCRIPTIONS

Figure 1:
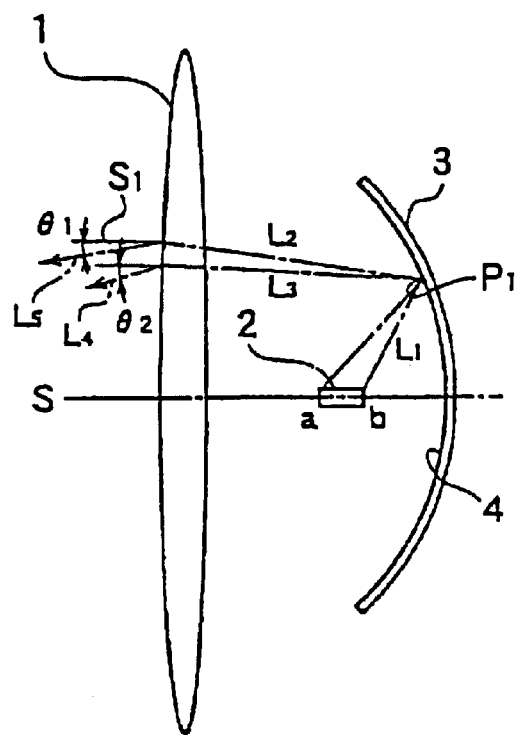
FIG. 1 is a vertical cross sectional view which shows a summary of a head lamp for a motor vehicle in accordance with an embodiment of the invention.

A description will be given below of an example of an embodiment of a lamp device for a vehicle in accordance with the invention with reference to the accompanying drawings. In this case, the invention is not limited by the embodiment.

The embodiment explains a head lamp for a motor vehicle which can obtain a light distribution pattern of a low beam (a light distribution pattern for crossing). In this case, the invention can be applied to the other lamp device for a vehicle. For example, the invention can be applied to a head lamp for a motor vehicle which can obtain a light distribution pattern of a high beam, a light distribution pattern for a high speed travel, alight distribution pattern for an urban area travel and the like, a fog lamp for a motor vehicle which can obtain a light distribution pattern for a dense fog, or the like.

The head lamp for the motor vehicle in accordance with the invention is equipped in a motor vehicle sectioned in a left-hand traffic. Accordingly, in the case of a head lamp for a motor vehicle equipped in a motor vehicle sectioned in a right-hand traffic, right and left sections are reversed on the drawing.

The head lamp for the motor vehicle in accordance with the embodiment is provided with a lens 1 arranged in a front surface of a lamp housing (not shown), a light source 2 and a reflector 3. In this case, reference symbol S denotes an optical axis.

The lens 1 is structured, as shown in FIGS. 1 to 4, such that an outer shape seen from a front surface is formed in a circular shape (may be formed in a rectangular shape), and a shape of a vertical cross section and a shape of a horizontal cross section are formed in a convex shape. A prism for light distribution is not formed in the lens 1. A non-uniform rational B-spline surface (NURBS) corresponding to a free curved surface for light distribution is formed on a front surface and a back surface of the lens 1. The lens 1 may be made of a glass or a resin.

The light source 2 employs, for example, a halogen lamp of a single filament or a double filament, an incandescent lamp, an electric discharge lamp or the like (so-called H1, H3, H4, H7, H11 or the like).

A reflection surface 4 of the NURBS corresponding to the free curved surface for light distribution is formed on an inner surface of the reflector 3. The reflection surface 4 takes on a high intensity feeling of a metal on the basis of an aluminum vapor deposition, a silver color painting or the like. The reflector 3 may be integrally formed with the lamp housing or independently formed therefrom. Further, outer shapes of the reflector 3 and the reflection surface 4 seen from front surfaces thereof may be formed in a circular shape or a rectangular shape. Further, details of the reflection surface 4 of the NURBS are described, for example, in "Mathematical Elements for Computer Graphics" (Devid F. Rogers, J Alan Adams).

That is, the reflection surface 4 of the NURBS in the case in which the front surface and the back surface use the lens 1 of the NURBS can be calculated in accordance with a general equation in the following equation (1).

$$P(u, v) = \sum_{j=0}^{m} \sum_{k=0}^{n} P_{j,k} N_{j,s}(u) M_{k,t}(v) \quad (1)$$

Figure 2:
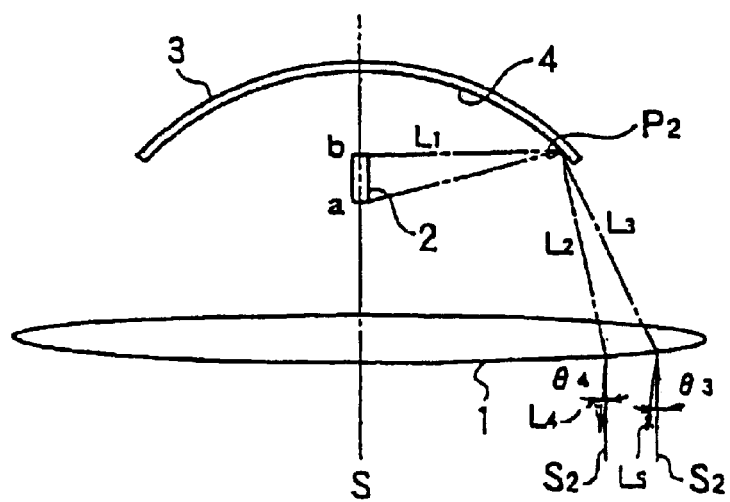
FIG. 2 is a horizontal cross sectional view.

The reflection surface 4 of the NURBS calculated in accordance with the above equation (1) is structured such that the vertical cross section and the horizontal cross section are formed in a substantially hyperboloidal surface (a surface similar to a hyperboloidal surface) smaller than the lens 1 as shown in FIGS. 1 and 2.

A parametric function of the general equation in the above equation (1) is shown in the following equation (2). A particular reflection surface 4 of the reflector 3 in the case of using the lens 1 can be obtained by substituting a particular numeric value, for example, a point on the hyperboloidal surface or the like for the parametric function in the following equation (2).

$$N_{j,s}(u) = \begin{cases} 1 & (\text{if } u_j \le u < u_{j+1}) \\ 0 & (\text{the other cases}) \end{cases} \quad (2)$$

$$N_{j,s}(u) = \frac{u - u_j}{u_{j+s-1} - u_j} N_{j,s-1}(u) + \frac{u_{j+s} - u}{u_{j+s} - u_{j+1}} N_{j+1,s-1}(u)$$

$$M_{k,t}(v) = \begin{cases} 1 & (\text{if } v_k \le v < v_{k+1}) \\ 0 & (\text{the other cases}) \end{cases}$$

$$M_{k,t}(v) = \frac{v - v_k}{v_{k+t-1} - v_k} M_{k,t-1}(v) + \frac{v_{k+t} - v}{v_{k+t} - v_{k+1}} M_{k+1,t-1}(v)$$

Figure 5:
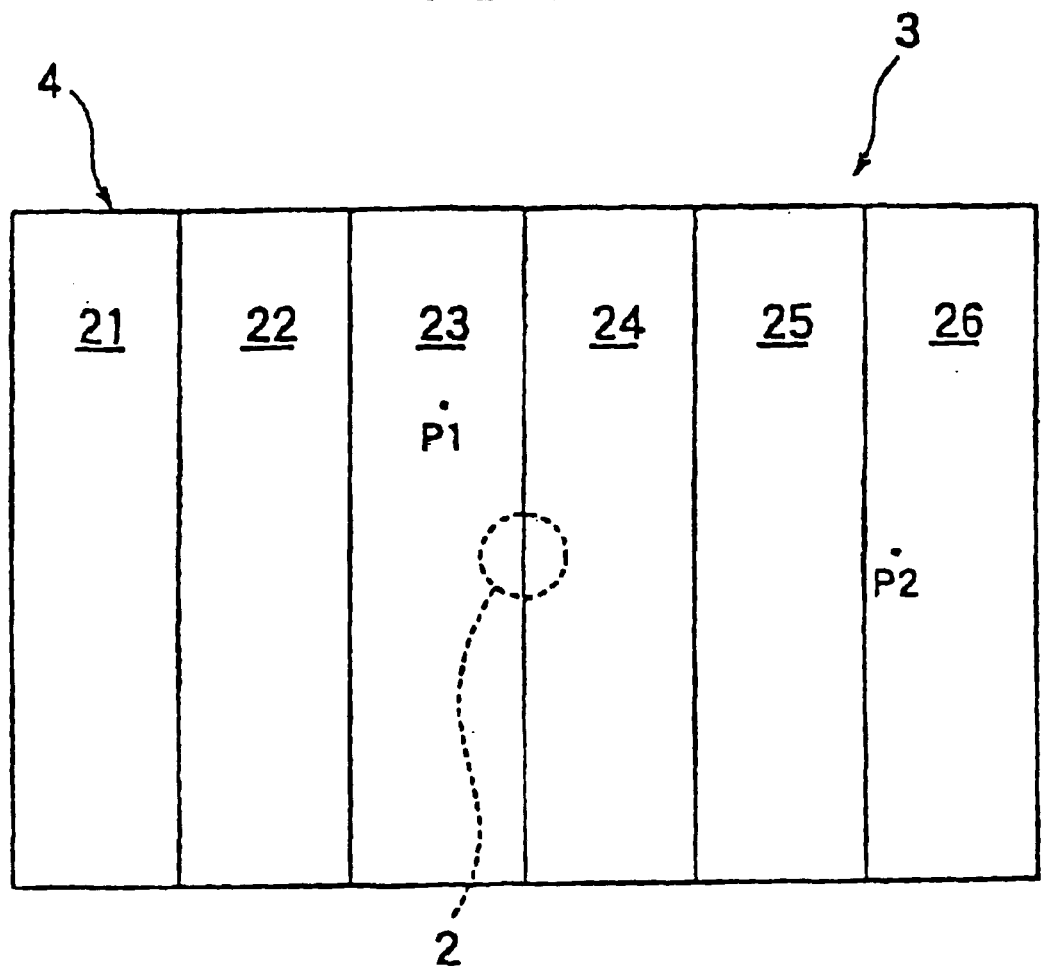
FIG. 5 is a front elevational view of a reflection surface.

An example of the particular reflection surface 4 obtained in the manner will be shown in FIG. 5. The reflection surface 4 in this one example is vertically separated into six pieces. Boundary lines (joint lines) of these six separated reflection surface blocks (or reflection surface segments) 21, 22, 23, 24, 25 and 26 (21 to 26) include a type in which the reflection surface blocks 21 to 26 are independently visible as shown, and a type in which the reflection surface blocks 21 to 26 are not continuously visible.

In this case, the reflection surface 4 shown in FIG. 5 corresponds to one example in which the reflection surface blocks are separated in a vertical direction. Therefore, in accordance with the invention, the reflection blocks may be separated in a horizontal direction, separated in a radial direction or separated in the vertical direction, the horizontal direction and the radial direction in a suitably combined manner. That is, the reflection surface blocks may be separated with taking a design thereof into consideration.

In this case, since the reflection surface 4 is structured such that the reflection surfaces of the NURBS are combined in a composite manner, a single optical axis in the strict sense is not provided in the optical axis S of the reflection surface 4, however, a difference among a plurality of optical axes is slight, and substantially the same optical axis is commonly used. Accordingly, in this specification and the drawings, the substantially same optical axis is called as an artificial optical axis (or simply an optical axis) S. In the same manner, in a focus F of the reflection surface 4 (refer to FIG. 7C), a single optical axis in the strict sense is not provided, however, a difference among a plurality of optical axes is slight, and substantially the same optical axis is commonly used. Accordingly, in this specification and the drawings, the substantially same optical axis is called as an artificial optical axis (or simply an optical axis).

A description will be given below of an example of a method of manufacturing the reflection surface 4 with reference to FIG. 6.

At first, in a step 1 (S1), a data is input to a microcomputer (not shown). The data is selected among a design specification and the like in a data base with taking a design of a head lamp for a motor vehicle and a design of the motor vehicle mounting the head lamp for the motor vehicle thereon. The data includes a kind of the light source 2, a size of the reflector 3, a front surface shape of the reflection surface 4, a separation of the reflection surface blocks 21 to 26, a size, a front surface shape and a back surface shape of the lens 1, a target light distribution pattern and the like.

In a step 2 (S2), there is executed a process of temporarily setting the reflection surface of the reflector in accordance with a combination with a planar lens on the basis of the data input in the step 1 so that the target light distribution pattern can be obtained. The reflection surface of the temporarily set reflector is automatically set on the basis of a control point on the free curved surface of the NURBS, a normal vector and the like.

In a step 3 (S3), there is executed a process of changing the planar lens to the lens 1 in which the vertical cross section and the horizontal cross section are formed in the convex shape, without changing the reflection surface of the temporarily set reflector obtained in accordance with the process in the step 2. At this time, in accordance with a ray tracing method, a light distribution pattern (not shown) of an image which is formed by a process in which the light output from the modeled light source 2 is reflected on the reflection surface of the reflector, and the reflected light is refracted by the lens and thereafter reaches on a forward screen (not shown) as an outgoing light, can be obtained by a calculation.

In a step 4 (S4), there is executed a process of calculating a difference between the target light distribution pattern obtained in accordance with the process in the step 2 and the light distribution pattern obtained in accordance with the process in the step 3. This difference is generated by a refraction of the light in the lens 1.

In a step 5 (S5) and a step 6 (S6), there is executed a process of formally setting the reflection surface of the temporarily set reflector to the reflection surface 4 of the reflector 3 for the lens 1 so that the difference calculated in accordance with the process in the step 4 becomes 0. That is, an optimum free curved surface of the NURBS is formed by automatically correcting and deforming the free curved surface of the NURBS on the reflection surface so that the light distribution pattern obtained in accordance with the process in the step 3 becomes the target light distribution pattern obtained in accordance with the process in the step 2. The processes in the step 5 and the step 6 corresponds to a process of repeating a ray tracing calculation in which the light output from the light source 2 is reflected on the reflection surface 4 of the reflector 3, and the reflected light is refracted by the lens 1 and thereafter reaches on the forward screen (not shown) as the outgoing light beam, in accordance with the ray tracing method.

When the difference becomes substantially 0, it is assumed that the reflection surface 4 of the reflector 3 for the lens 1 is formerly set, and in a step 7 (S7), the reflection surface 4 of the formerly set reflector 3 is output.

As mentioned above, in this manufacturing method, it is possible to manufacture the reflection surface 4 of the NURBS in the case of using the lens 1 in which the front surface and the back surface are the NURBS. Further, by executing the processes in the steps 2 to 6, that is, the temporarily setting step of the reflection surface of the reflector 3, the difference calculating step, and the formerly setting step of the reflection surface 4 of the reflector 3 in accordance with a predetermined program by a computer, it is possible to manufacture the reflection surface 4 at a high accuracy, a high speed and a high degree of freedom.

A description will be given in detail of a result obtained by executing a trial an optical design simulation of the head lamp for the motor vehicle in accordance with this embodiment. FIGS. 7A to 7D are explanatory views which show a data input to the optical design simulation. Data sizes in FIGS. 7A to 7D are respectively as follows.

Ar=100 mm (horizontal size of the reflector 3)
Br=100 mm (vertical size of the reflector 3)
Al=160 mm (horizontal size of the lens 1)
Bl=160 mm (vertical size of the lens 1)
T=28 mm (thickness size of the lens 1 (in the optical axis S))
Sv=0 degree (angle of incline of side surface in the lens 1 (in the optical axis S))
Sh=0 degree (angle of incline of plane surface in the lens 1 (in the optical axis S))
Rvo=−300 mm (radius of curvature in the side surface optical axis S of front surface in the lens 1)
Rho=−300 mm (radius of curvature in the plane surface optical axis S of front surface in the lens 1)
Rvi=200 mm (radius of curvature in the side surface optical axis S of back surface in the lens 1)
Rhi=200 mm (radius of curvature in the plane surface optical axis S of back surface in the lens 1)
F=22 mm (focal distance)
Lf=4.6 mm (length of filament of the light source 2)
Rf=0.73 mm (radius of filament of the light source 2)

The data is input to values in Table 1 described below. In this case, a condition is made so that an European Light Distribution Regulation ECE Reg. is satisfied.

TABLE 1

| Reflector 3 | | |
|---|---|---|
| Horizontal Ar (mm) | Vertical Br (mm) | Focal distance F (mm) |
| 100 | 100 | 20 |

When lighting the light source 2 of the head lamp for the motor vehicle in accordance with the embodiment, the following result in Table 2 will be obtained.

TABLE 2

| European Light Distribution Regulation | | Satisfaction |
|---|---|---|
| Maximum light intensity (cd) | | 24800 |
| Use light intensity (lm) | | 408 |
| Light generating section (mm) | Vertical | 160 |
| | Horizontal | 160 |
| | Thickness | 28 |

In the head lamp for the motor vehicle in accordance with this embodiment, the light source 2 is turned on. Then, as shown in FIGS. 1 and 2, a light $L_1$ output from the light source 2 is reflected on the reflection surface 4 of the reflector 3, and the reflected lights $L_2$ and $L_3$ are irradiated outward as outgoing lights $L_4$ and $L_5$ via the lens 1 on the basis of a target light distribution pattern shown in FIG. 9. The target light distribution pattern corresponds to a light distribution pattern proper to a light distribution regulation such as European Light Distribution Regulation ECE Reg. or a regulation based thereon (for example, Japan Domestic Model Certified Regulation), North America Light Distribution Regulation, FMVSS or the like.

Figure 15:
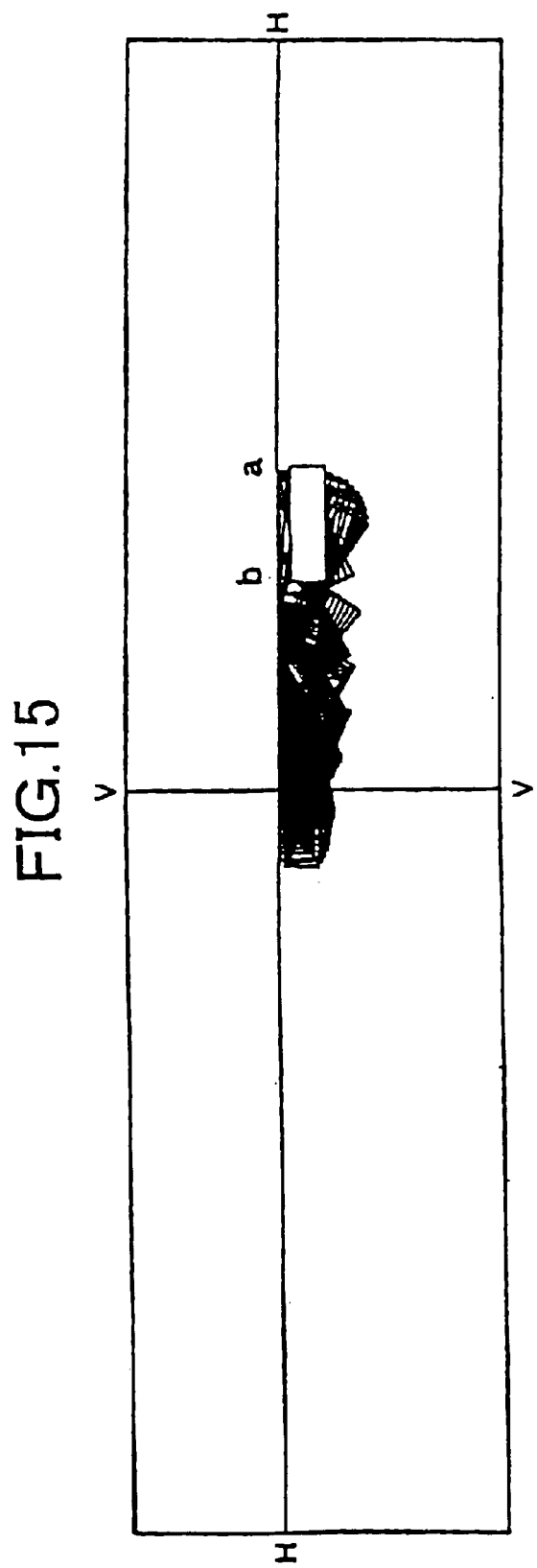
FIG. 15 is an explanatory view of a light distribution pattern briefly showing a light distribution pattern obtained by the lens 1 shown in FIGS. 1 to 4 and a sixth reflection surface block 26 from the left of the reflection surface 4 shown in FIG. 5, which is obtained in accordance with the simulation of the computer.

The target light distribution pattern shown in FIG. 9 corresponds to a light distribution pattern of a low beam sectioned in a left-hand traffic, and is controlled by the respective reflection surface blocks 21 to 26 of the reflection surface 4 in the reflector 3. That is, in the reflection surface 4 of the reflector 3 shown in FIG. 5, a light distribution pattern shown in FIG. 10 is controlled and obtained in a first reflection surface block 21 from the left, a light distribution pattern shown in FIG. 11 is controlled and obtained in a second reflection surface block 22 from the left, a light distribution pattern shown in FIG. 12 is controlled and obtained in a third reflection surface block 23 from the left, a light distribution pattern shown in FIG. 13 is controlled and obtained in a fourth reflection surface block 24 from the left, a light distribution pattern shown in FIG. 14 is controlled and obtained in a fifth reflection surface block 25 from the left, and a light distribution pattern shown in FIG. 15 is controlled and obtained in a sixth reflection surface block 26 from the left, respectively. By combining the light distribution pattern (FIGS. 10 to 15) controlled and obtained by the respective reflection surface blocks 21 to 26, the target light distribution pattern shown in FIG. 9 is obtained.

As is apparent from FIGS. 10 to 15, in the first, second and sixth reflection blocks 21, 22 and 26 from the left, since they are apart from the light source 2, the reflected light is weak. Accordingly, in these reflection blocks 21, 22 and 26, a hot zone is formed by collecting the weak reflected lights. Therefore, the reflection surfaces of the reflection blocks 21, 22 and 26 are mainly formed in a recessed surface shape.

On the contrary, in the third to fifth reflection blocks 23 to 25 from the left, since they are close to the light source 2, the reflected light is strong, so that the strong reflected light simply forming a spot light is diffused. Accordingly, the reflection surfaces of the reflection blocks 23 to 25 are mainly formed in a convex surface shape.

In this case, in a design of a theoretical reflection surface 4, the light source 2 is prepared as a point light source, however, since the actual light source 2 has the length and the width (the radius) of the filament as is apparent from FIGS. 1 and 2, it is not the point light source but a surface light source.

Accordingly, for example, as shown in FIG. 5, when the light of the light source 2 is reflected at one point $P_1$ on the reflection surface 4 in the third reflection surface block 23 from the left which is closest to the light source 2, the outgoing light $L_5$ output from a rear end b of the light source (filament) 2 is emitted to a lower side at an angle $Ø_1$ with respect to a horizontal line $S_1$, as shown in FIG. 1. On the contrary, the outgoing light $L_4$ output from a front end a of the light source (filament) 2 is emitted to a lower side at an angle $Ø_2$ with respect to the horizontal line $S_1$. The emitted lights $L_4$ and $L_5$ are formed in a longitudinal shape in a vertical direction substantially in a center section on the screen, as shown in FIGS. 8A and 12. Further, they are slightly inclined from the light source 2 at a difference in the lateral direction. The angles $Ø_1$ and $Ø_5$ of the outgoing lights $L_4$ and $L_5$ emitted from the lens 1 with respect to the horizontal line $S_1$ are the same as the angle $Ø_1$ and $Ø_2$ on the screen from a horizontal line H—H, as shown in FIG. 8A.

For example, as shown in FIG. 5, when the light of the light source 2 is reflected at one point $P_2$ on the reflection surface 4 in the sixth reflection surface block 26 from the left, the outgoing light $L_5$ output from the rear end b of the light source (filament) 2 is emitted to an inner side at an angle θ3 with respect to a vertical line $S_2$, as shown in FIG. 2. On the contrary, the outgoing light $L_4$ output from the front end a of the light source (filament) 2 is emitted to an inner side at an angle θ4 with respect to the vertical line $S_2$. The emitted lights $L_4$ and $L_5$ are formed in a longitudinal shape in a lateral direction in a left side of the substantially center section on the screen, as shown in FIGS. 8B and 10. The angles θ3 and θ4 of the outgoing lights $L_4$ and $L_5$ emitted from the lens 1 with respect to the vertical ling $S_2$ are the same as the angle θ3 and θ4 on the screen from a vertical line V—V, as shown in FIG. 8B.

As mentioned above, the free curved surface formed on the reflection surface 4 is formed by simulating the light distribution pattern generated by the free curved surface by the computer so as to analyze a light distribution property, thereby obtaining an optimum light distribution pattern. Accordingly, the light distribution pattern of the outgoing lights $L_4$ and $L_5$ at a time when the reflected light $L_2$ and $L_3$ generated by the reflection surface 4 pass through the lens 1 so as to be irradiated outward is optimum. Further, in this embodiment, since the free curved surface (NURBS) is formed on the front surface and the back surface of the lens 1, the light distribution function can be given not only to the reflection surface 4 but also the lens 1, whereby a more ideal light distribution pattern can be obtained.

In particular, since the headlamp for the motor vehicle in accordance with this embodiment is structured such that the vertical cross section and the horizontal cross section of the lens 1 are formed in the convex shape, the light is largely refracted by the lens 1 and the interior section is hard to be visible in the case of being seen from the exterior section, even when the prism is not formed. Accordingly, in the head lamp for the motor vehicle in accordance with this embodiment, it is not necessary to finish the surface of the reflection surface 4 of the reflector 3 so as to have the optical performance equal to or more than the optical performance required for reflection with taking the appearance into consideration, and the working operation can be easily executed in comparison with the conventional one.

The lens 1 in accordance with this embodiment is structured such that the shape of the vertical cross section and the shape of the horizontal cross section are formed in the convex shape. Accordingly, in the vertical and horizontal sections of the lens 1, as shown in FIGS. 1 and 2, the lights $L_2$ and $L_3$ diffused by the substantially hyperboloidal surface of the reflection surface 4 are focused in the direction substantially extending along the optical axis S, and are irradiated to the external section on the basis of the target light distribution pattern. As a result, in the embodiment, it is possible to construct the head lamp for the motor vehicle in which the light generation area is large and the reflector 3 is small. Accordingly, the embodiment is preferably employed in the case of a vehicle body design in which a large placing space can not be sufficiently secured in an inner section of a front section to which the headlamp for the motor vehicle should be mounted, particularly in the case of a compact car.

Figure 3:
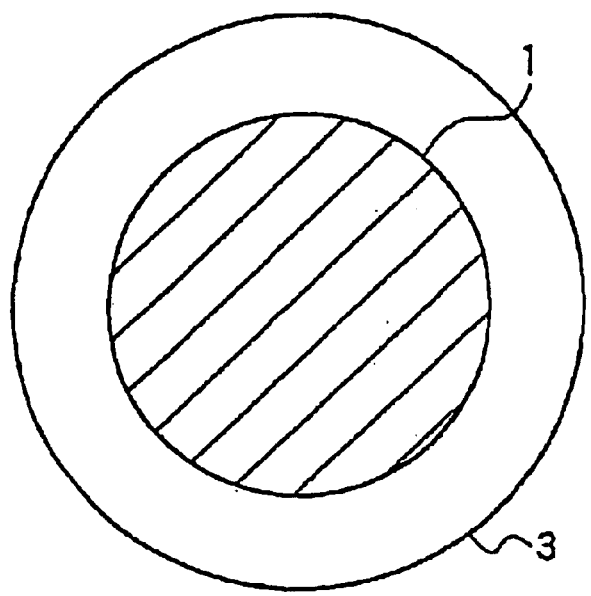
FIG. 3 is a front elevational view.
Figure 4:
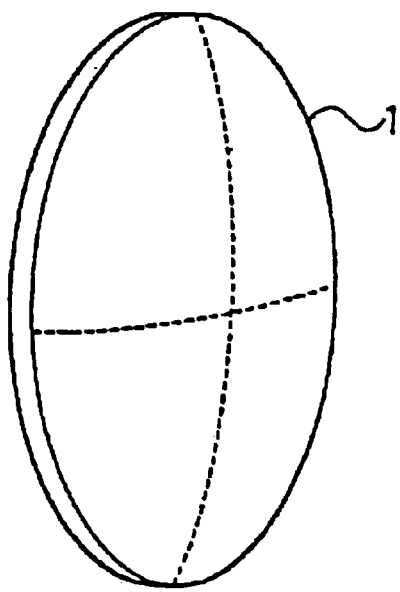
FIG. 4 is a perspective view of a lens.

The reflection surface 4 in accordance with this embodiment is structured such that the vertical cross-section and the horizontal cross section are formed in the substantially hyperboloidal surface smaller than the lens 1. Accordingly, in the vertical cross section and the horizontal cross section of the reflection surface 4, as shown in FIGS. 1 and 2, the lights $L_2$ and $L_3$ can be introduced into the lens 1 in a state of being diffused vertically and horizontally with respect to the optical axis S. As a result, in this embodiment, the vertical cross section and the horizontal cross section are optimum for the combination with the lens 1 formed in the convex shape, and as shown in FIG. 3, it is possible to easily obtain the head lamp for the motor vehicle in which the placing space of the inner section of the front surface (the lens 1 surface) can not be sufficiently secured.

Figures 16A, 16B, 16C:
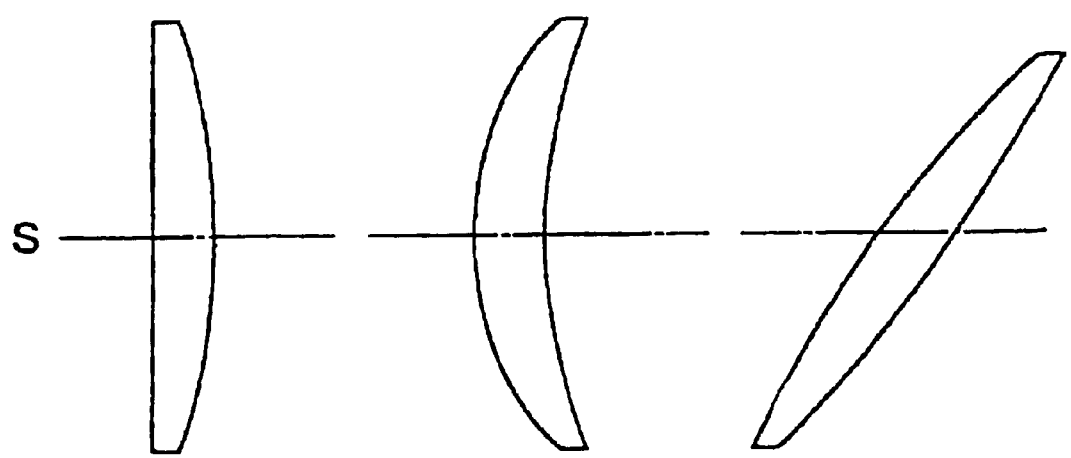
FIGS. 16A, 16B and 16C are cross sectional views which show a modified embodiment of a convex shape corresponding to a cross sectional shape of the lens.

In this case, in this embodiment, the convex shape of the vertical cross section and the horizontal cross section of the lens 1 means a shape having an optical function which refracts the incident light in a direction moving apart (diffusing) from the optical axis S, on the vertical cross surface of the lens 1. Accordingly, the convex shape includes a shape in which only one surface is formed in a convex shape as shown in FIG. 16A, a shape in which one surface is formed in a recess surface and another surface is formed in a convex surface in more degree as shown in FIG. 16B, a shape in which the lens is arranged in an inclined manner with respect to the optical axis S as shown in FIG. 16C, and the like.

In this embodiment, the NURBS corresponding to the free curved surface for light distribution is formed on the front surface and the back surface of the lens 1. However, in this invention, a free curved surface or a torus curved surface for light distribution other than the NURBS may be formed on the front surface and the back surface of the lens 1.

In this invention, the NURBS, the free curved surface or the torus curved surface corresponding to the free curved surface for light distribution may be formed on any one of the front surface and the back surface of the lens 1.

In this invention, the NURBS, the free curved surface or the torus curved surface corresponding to the free curved surface for light distribution may not be formed on the front surface and the back surface of the lens 1.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lamp device for a vehicle comprising:

a light source;

a reflector in which a reflection surface is a free curved surface;

a lens having no prism; and wherein light reflected by said reflector from said light source is transmitted through said lens so as to irradiate an external section in accordance with a target light distribution pattern, and wherein said lens is formed in a convex shape in a vertical cross section and a horizontal cross section.

2. The lamp device for a vehicle according to claim 1, wherein the reflection surface of said reflector is structured such that the vertical cross section and the horizontal cross section are formed in a substantially hyperboloidal surface smaller than said lens.

3. The lamp device for a vehicle according to claim 2, wherein a free curved surface formed on the reflection surface of said reflector is a non-uniform rational B-spline surface (NURBS).

4. The lamp device for a vehicle according to claim 3, wherein a torus curved surface or a free curved surface is formed on a front surface or/and a back surface of said lens.

5. The lamp device for a vehicle according to claim 2, wherein a torus curved surface or a free curved surface is formed on a front surface or/and a back surface of said lens.

6. The lamp device for a vehicle according to claim 1, wherein a free curved surface formed on the reflection surface of said reflector is a non-uniform rational B-spline surface (NURBS).

7. The lamp device for a vehicle according to claim 6, wherein a torus curved surface or a free curved surface is formed on a front surface or/and a back surface of said lens.

8. The lamp device for a vehicle according to claim 1, wherein a torus curved surface or a free curved surface is formed on a front surface or/and a back surface of said lens.

9. The lamp device for a vehicle according to claim 1, wherein the light source emits light, the reflector reflects the light, the reflection surface comprises a plurality of reflection surfaces, each including a free curved surface for providing a light distribution pattern, the lens transmits the reflected light such that the reflected light from the reflector transmits through the lens so as to irradiate the external section in accordance with a target light distribution pattern, and the target light distribution pattern is formed by combining the light distribution patterns of the reflection surfaces.

\* \* \* \* \*